(12) United States Patent
Mao et al.

(10) Patent No.: US 7,547,002 B2
(45) Date of Patent: Jun. 16, 2009

(54) INTEGRATED FUEL INJECTION AND MIXING SYSTEMS FOR FUEL REFORMERS AND METHODS OF USING THE SAME

(75) Inventors: Chien-Pei Mao, Clive, IA (US); John Short, Norwalk, IA (US)

(73) Assignee: Delavan Inc, West Des Moines, IA (US)

( * ) Notice: Subject to any disclaimer, the term of this patent is extended or adjusted under 35 U.S.C. 154(b) by 336 days.

(21) Appl. No.: 11/108,066

(22) Filed: Apr. 15, 2005

(65) Prior Publication Data

US 2009/0065957 A1    Mar. 12, 2009

(51) Int. Cl.
*F02M 29/06*    (2006.01)
(52) U.S. Cl. .................... 261/78.1; 261/78.2; 261/79.1; 261/79.2; 261/DIG. 55
(58) Field of Classification Search ............. 261/79.1, 261/79.2, 112.1, 112.2, 78.1, 78.2, DIG. 55; 422/211, 220
See application file for complete search history.

(56) References Cited

U.S. PATENT DOCUMENTS

| | | | | |
|---|---|---|---|---|
| 538,557 | A | * | 4/1895 | Theisen ...................... 261/109 |
| 1,233,557 | A | * | 7/1917 | Curtis ........................ 261/44.5 |
| 1,498,839 | A | * | 6/1924 | Hartman ................... 261/114.1 |
| 1,767,305 | A | * | 6/1930 | Musall ....................... 261/44.5 |
| 1,927,090 | A | * | 9/1933 | Hess ......................... 261/44.2 |
| 2,981,665 | A | * | 4/1961 | Kloss ......................... 202/158 |
| 3,336,017 | A | * | 8/1967 | Kopa .......................... 261/128 |
| 3,393,984 | A | * | 7/1968 | Wisman ..................... 48/189.4 |
| 3,395,899 | A | * | 8/1968 | Kopa ............................ 261/22 |
| 3,400,818 | A | * | 9/1968 | Tarjan ......................... 209/170 |
| 3,512,359 | A | * | 5/1970 | Pierce .......................... 60/748 |

(Continued)

FOREIGN PATENT DOCUMENTS

DE    10 2004 055 425 A1    5/2006

(Continued)

OTHER PUBLICATIONS

International Search Report dated Apr. 20, 2007.

(Continued)

*Primary Examiner*—Richard L Chiesa
(74) *Attorney, Agent, or Firm*—Scott D. Wofsy; Edwards Angell Palmer & Dodge LLP

(57) ABSTRACT

Systems and methods for injecting and mixing a liquid hydrocarbon fuel to provide a uniform, homogenous fuel vapor mixture for introduction into a fuel reformer for use with a fuel cell are disclosed. Preferably, the system includes a fuel injector that generates and aspirate a liquid fuel in the presence of an atomizing gas stream; a diverging-converging mixing chamber, into which the atomized fuel and a secondary fluid stream are introduced, to enhance the mixing of the fuel and the added heated gas or steam; and a mixer/swirler, which can be centrally located in the mixing chamber between the upper and lower chambers, to stabilize the fuel vapor mixture further for greater uniformity and homogeneity. More preferably, grooves and/or brazed wires can be provided on the surfaces of the mixing chamber and/or mixer/swirler to channel any accumulated fuel so as to provide sufficient time to evaporate the accumulated fuel.

37 Claims, 11 Drawing Sheets

U.S. PATENT DOCUMENTS

| | | | |
|---|---|---|---|
| 3,544,290 A * | 12/1970 | Larson, Sr. et al. | 48/189.5 |
| 3,641,743 A * | 2/1972 | Hoffmann et al. | 96/305 |
| 3,667,221 A * | 6/1972 | Taylor | 60/737 |
| 3,722,185 A * | 3/1973 | Miczek | 96/316 |
| 3,731,876 A | 5/1973 | Showalter | |
| 3,761,065 A * | 9/1973 | Rich et al. | 261/76 |
| 3,782,703 A * | 1/1974 | Kolar | 261/112.1 |
| 3,847,125 A * | 11/1974 | Malherbe | 123/325 |
| 3,868,698 A | 2/1975 | Dressler | |
| 4,098,582 A * | 7/1978 | Takeda | 23/293 R |
| 4,186,159 A * | 1/1980 | Huber | 261/112.2 |
| 4,265,702 A * | 5/1981 | Prudhon et al. | 159/48.1 |
| 4,267,131 A * | 5/1981 | Prudhon et al. | 261/153 |
| 4,370,304 A * | 1/1983 | Hendriks et al. | 422/224 |
| 4,600,544 A * | 7/1986 | Mix | 261/79.2 |
| 4,659,014 A | 4/1987 | Soth et al. | |
| 4,770,151 A | 9/1988 | Finlay | |
| 5,248,087 A | 9/1993 | Dressler | |
| 5,525,242 A * | 6/1996 | Kerecz | 210/758 |
| 6,162,046 A | 12/2000 | Young et al. | |
| 6,234,459 B1 * | 5/2001 | Rock | 261/79.2 |
| 6,238,815 B1 | 5/2001 | Skala et al. | |
| 6,338,472 B1 | 1/2002 | Shimazu et al. | |
| 6,536,748 B1 * | 3/2003 | Tachihara et al. | 261/79.2 |
| 6,601,776 B1 | 8/2003 | Oljaca et al. | |
| 6,627,342 B1 | 9/2003 | Nakamura et al. | |
| 6,630,244 B1 | 10/2003 | Mao et al. | |
| 6,641,084 B1 | 11/2003 | Huber et al. | |
| 6,736,376 B1 * | 5/2004 | DeLisle | 261/79.1 |
| 6,752,124 B1 | 6/2004 | Chang | |
| 6,760,212 B2 | 7/2004 | Cheever, Jr. et al. | |
| 6,803,029 B2 | 10/2004 | Dieckmann | |
| 6,820,864 B2 * | 11/2004 | Amou et al. | 261/78.1 |
| 6,866,024 B2 | 3/2005 | Rizzoni et al. | |
| 2003/0155666 A1 * | 8/2003 | Amou et al. | 261/79.1 |
| 2004/0000296 A1 | 1/2004 | Linna et al. | |
| 2004/0086436 A1 | 5/2004 | Boltze et al. | |
| 2004/0124259 A1 | 7/2004 | Guezennec et al. | |
| 2005/0081833 A1 | 4/2005 | Pellizzari et al. | |
| 2005/0210877 A1 | 9/2005 | Rabinovich et al. | |

FOREIGN PATENT DOCUMENTS

| | | | |
|---|---|---|---|
| EP | 0903184 | 3/1999 | |
| EP | 1 243 630 A2 | 9/2002 | |
| EP | 1243 630 A2 | 9/2002 | |
| EP | 1252679 | 10/2002 | |
| EP | 1 571 726 A1 | 9/2005 | |
| EP | 1571726 A1 | 9/2005 | |
| FR | 2417018 | 9/1979 | |
| GB | 944 845 A | 12/1963 | |
| JP | 56-31438 A * | 3/1981 | 261/79.2 |
| WO | WO 94/05906 | 3/1994 | |
| WO | WO 01/54219 A1 | 7/2001 | |
| WO | WO 2004/035188 | 4/2004 | |
| WO | WO 2004/050257 A1 | 6/2004 | |
| WO | WO 2004/065782 | 8/2004 | |
| WO | WO 2004/091758 A1 | 10/2004 | |
| WO | WO 2006/053534 A1 | 5/2006 | |

OTHER PUBLICATIONS

International Search Report dated Apr. 25, 2007.
European Search Report dated Jul. 16, 2007.

* cited by examiner

INTEGRATED FUEL INJECTION AND MIXING SYSTEMS FOR FUEL REFORMERS AND METHODS OF USING THE SAME

FIELD OF THE INVENTION

The present invention relates to fuel injection and mixing systems and related methods of mixing fuel and, more particularly, to integrated fuel injection and mixing systems for use with fuel reformers to generate hydrogen-rich gas for use in fuel cells and related methods of mixing fuel.

BACKGROUND OF THE INVENTION

Fuel cells are alternative energy producing systems that generate electricity from common fuel sources such as natural gas and that, typically, have higher efficiencies and lower emissions than conventional systems. More specifically, fuel cells are electro-mechanical devices that provide electrical power by reacting, for example, hydrogen gas ($H_2$) usually in the form of natural gas or ethanol with an oxidant, e.g., air or oxygen gas ($O_2$). The gases react to produce electrical current and a relatively harmless water bi-product.

For example, a fuel, e.g., hydrogen gas ($H_2$), can be introduced at a first electrode (an anode), where a catalyst encourages production of protons, i.e., hydrogen ions ($H^+$), and electrons ($e^-$) in accordance with the following equation:

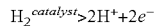

The electrons ($e^-$) are collected in an electric circuit that transmits the electrons to a second electrode (a cathode). Electron flow from the anode to the cathode constitutes usable current, i.e., power. The protons ($H^+$) travel through the electrolyte membrane to the cathode, where, contemporaneously, an oxidant, e.g., air or oxygen gas ($O_2$), is introduced. The oxidant and cathode catalyst react electrochemically with the hydrogen protons and the electrons to produce water and heat in accordance with the following equation:

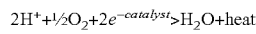

In addition to high manufacturing cost, the fuel cell industry is faced with several critical challenges that must be resolved before fuel cell systems can be fully commercialized for wide spread power generation applications. These challenges include, without limitation: innovative anode/electrolyte/cathode materials for lower electrochemical losses; durable fuel cell interconnects; improved sealing concepts; compatible metallic interconnects; advanced stack cooling; low-cost fabrication processes; understanding of soot/carbon deposit mechanisms; efficient fuel reformer; and de-sulfurization systems.

There are a number of types of fuel cells, which include, among others, phosphoric acid, proton exchange membrane, molten carbonate, solid oxide, and alkaline. Among the various types of fuel cells, the solid oxide fuel cell ("SOFC") exhibits many advantages over the other fuel cell systems for power generation. For example, the SOFC has the highest energy efficiency and can tolerate low-cost catalytic materials. Moreover, existing studies indicate that the SOFC system is probably one of the most reliable power generation technologies. Further, the SOFC is best suited for integration with conventional gas turbine engines for improvements in fuel consumption and emission pollution. Most importantly, the SOFC system can operate directly with hydrocarbon fuels, being able to utilize the existing refueling infrastructure fully. Because of these significant advantages, the fuel cell industry has been working diligently to develop compact, efficient, fuel reformers that can effectively convert liquid hydrocarbon fuels into hydrogen-rich gas for SOFC systems used in auxiliary power units.

Liquid hydrocarbon fuels can be reformed to produce hydrogen-rich gas through partial oxidation, steam or autothermal reforming. The major requirements for the fuel reformer system used with the SOFC include simple construction, small size and weight, low manufacturing cost, lower operating pressure and temperature, high conversion efficiency, carbon and sulfur tolerance, multi-fuel capability, maximum thermal integration, low maintenance intervals, rapid startup, and acceptable transient response.

A review of the existing fuel processing technologies indicates that most fuel reformers are in the prototype and demonstration stage. In short, current, state-of-the-art fuel reformers are not yet capable of meeting the stringent requirements for commercial or military applications. Particularly, current, state-of-the-art fuel reformers are heavy in weight, large in physical size, and provide only moderate conversion efficiency. Furthermore, most of the fuel reformers are vulnerable to carbon formation, necessitating either frequent cleaning or high oxygen/carbon ("O/C") ratios for sustained operation. Operating at high O/C ratios, however, reduces the overall system efficiency. Also, the existing catalysts used for the reformers cannot tolerate significant sulfur levels and thus require the liquid fuels to be desulfurized.

Another major difficulty for SOFC reformers germane to the present invention involves the atomization and mixing of liquid fuel with heated air and/or superheated steam. Failure to provide a uniform fuel vapor mixture prior to entering the catalytic reactor can result in hot spots and carbon formation. Moreover, non-uniform gas streams within the mixing chamber and/or catalytic reactor also could lead to significant performance degradation and reduced reformer efficiency. Finally, the catalytic reactor also may encounter a significant pressure drop due to carbon or soot deposits and build-up, which would necessitate additional pressure or momentum to force the gas streams through the catalytic reactor.

Referring to FIG. 1, there is shown a conventional fuel reformer system 10. Typically, a fuel reformer system 10 comprises an integrated fuel injection and mixing system 10 that is connected to a catalytic reactor 3. Ideally, a fuel injector 1 is mounted to or otherwise operatively associated with a mixing chamber 2. The fuel injector/mixing chamber combination supplies a uniform or near uniform fuel vapor mixture to the catalytic reactor 3, which produces a hydrogen-rich gas.

More particularly, liquid hydrocarbon fuel, e.g., natural gas, diesel fuel, jet fuel, gasoline, kerosene or the like, can be supplied to a fuel injector 1, for example, via a control valve 6. To assist fuel atomization, a heated gas stream 4 is simultaneously supplied to the fuel injector, e.g., through a regulator valve 7. Depending on the reformer type, the atomizing gas stream 4 could be either steam flow or heated airflow. For steam- and auto-thermal-type reformers, steam flow is used as the atomizing gas stream 4. Whereas, for partial oxidation-type catalytic reformers, heated airflow is used as the atomizing gas stream 4.

For most fuel reforming applications, it also is preferred that a uniform, secondary fluid flow 5 be supplied to the mixing chamber 2 and, more specifically, the uniform, secondary fluid flow 5 be supplied around the outlet of the fuel injector 1. Providing such a uniform, secondary fluid flow 5 enhances the mixing process and also minimizes liquid fuel droplets from adhering or otherwise attaching to the walls of the mixing chamber 2. A controller 8 can be used to adjust the required flow rates for all three feed streams. More specifically, the controller 8 can control the flow of liquid fuel to the injector 1 by controlling valve 6 and can control the delivery of steam flow or heated airflow to the fuel injector 1 and/or mixing chamber 2 by controlling control valve 7.

To develop a compact, efficient fuel reformer system, it would be desirable to provide an integrated fuel injection and mixing system that can overcome the technical problems enumerated above. It also would be desirable to provide an injection and mixing system that could be easily integrated into various types of fuel reformers. Not only must the new fuel injection system demonstrate better conversion efficiency, it must also be more compact in size with fewer components and lower manufacturing cost. Finally, it would be desirable to provide an injection and mixing system that can demonstrate extended service life without the problem of carbon or coke deposition.

SUMMARY OF THE INVENTION

In its broadest sense, the present invention relates to integrated fuel injection and mixing systems for use with fuel reformers and fuel cells. Fuel reformers are operated with liquid hydrocarbon fuels to generate hydrogen-rich gas for use in a fuel cell, e.g., a solid oxide fuel cell. Preferably, the embodied injection and mixing systems are structured and arranged to operate with steam-type reformers, catalytic partial oxidation-type reformers, and/or auto-thermal-type reformers.

In preferred embodiments, the present invention provides integrated fuel injection and mixing systems comprising a gas-assisted simplex fuel injector, a stabilizing mixer/swirler, and a divergent-convergent mixing chamber. The injection system has the ability to effectively atomize liquid fuels and to achieve complete evaporation and mixing within a short distance at various operating conditions. The mixing chamber introduces a secondary fluid to assist in the mixing operation. Inside the mixing chamber, a flow-stabilizing mixer/swirler is utilized to help confine the spray whirling around the center body and to keep the spray from fluttering or biasing towards one side.

These components can be properly integrated as a compact unit to meet the various requirements of a fuel reformer. Optionally, the systems also can include mesh screens and/or anti-drooling and anti-carbon spiral grooves in the walls of the mixing chamber. Accordingly, not only do the embodied systems exhibit excellent performance in atomization and mixing, but they also tolerate carbon formation, allowing extended service life.

It is an object of the present invention to prepare the feed streams, i.e., the liquid fuel, steam flow, and heated airflow, in the form of a homogeneous fuel vapor mixture prior to entering the catalytic reactor. A gas-assisted simplex fuel injector is utilized to aspirate and generate fine droplets. In a preferred embodiment the fuel injector is structured and arranged to include both the pressure swirl and/or siphoning principles to provide fine droplets with uniform size distribution. Liquid fuel under pressure is forced through a pressure swirl atomizer tip located inside of a gas swirler. Depending on the reformer types, either heated airflow or steam flow is directed through spin holes in the gas swirler to assist liquid atomization and mixing. Alternatively, in another embodiment, the gas-assisted fuel injector is structured and arranged to employ only the principle of siphoning.

The fuel droplets are discharged into a divergent-convergent mixing chamber at high speed where they are thoroughly mixed with the surrounding heated airflow and/or steam flow. Thus, it is another object of the present invention to provide means for and methods of introducing a uniform secondary airflow into the mixing chamber to surround the central fuel spray to prevent fuel droplets from adhering to the chamber walls or accumulating near the corner areas.

The mixture of fuel droplets and surrounding feed streams are then forced through a mixer/swirler disposed in the central portion of the mixing chamber. The mixer/swirler is utilized to slow down the high-speed droplets and to redistribute the fuel mixture uniformly over the entire entrance area of the reformer.

In yet another embodiment, the present invention discloses a mixing chamber that incorporates a stack of mesh screens to further enhance the mixing and uniformity of the feed streams prior to entering the reactor section.

It is a further object of the present invention to provide a mixing chamber that can tolerate droplet impingement on the wall surfaces and the resulting potential of carbon formation due to fuel accumulation.

Other objects and advantages of the present invention will be made apparent to those skilled in the art from the accompanying drawings and descriptions.

BRIEF DESCRIPTION OF THE DRAWINGS

For a fuller understanding of the nature and desired objects of the present invention, reference is made to the following detailed description taken in conjunction with the accompanying figures. In the drawings, like reference characters generally refer to the same parts throughout the different views. Also, the drawings are not necessarily to scale, emphasis instead being placed upon illustrating the principles of the invention.

DETAILED DESCRIPTION OF PREFERRED EMBODIMENTS

Figure 1:
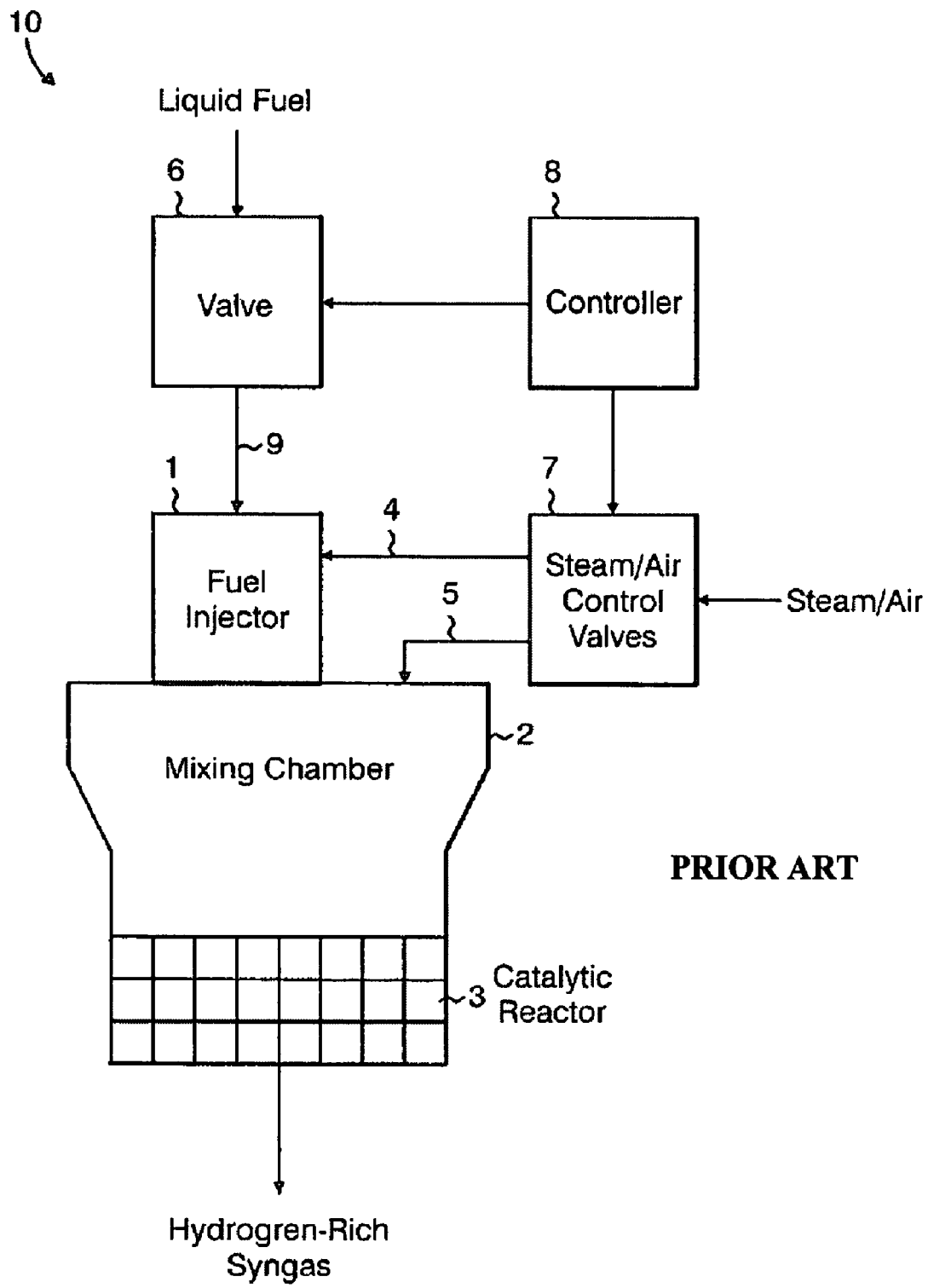
FIG. 1 is a schematic diagram of a simple fuel reformer system.

Referring again to FIG. 1, a simplified diagram of a fuel reformer 10 for use with a fuel cell is shown. Preferably, the fuel reformer 10 comprises a fuel injection system 1 and a mixing system 2 that are integrated and in communication with a catalytic reactor 3. Liquid fuel 9, e.g., liquid hydrocarbon fuel, is introduced into the fuel injector (injecting means) 1 via a control valve 6. The control valve 6 controls the volume and pressure of the fuel 9 being introduced into the fuel injector 1. Contemporaneously, a gas stream 4, e.g., an atomizing gas stream, is also introduced into the fuel injector 1 via a regulator, or steam/air control, valve 7. The regulator valve 7 controls the amount and velocity of the atomizing gas stream 4 being introduced into the fuel injector 1.

Depending on the reformer type, the atomizing gas stream 4 can comprise superheated steam flow or heated airflow or some combination of the two. Preferably, for steam-type and auto-thermal-type reformers, the atomizing gas stream 4 introduced into the fuel injector 1 will be steam flow and, for a catalytic partial oxidation-type reformer, the atomizing gas stream 4 introduced into the fuel injector 1 will be heated airflow.

For most fuel reforming applications, it is also preferred that a secondary fluid flow 5, e.g., a steam flow or heated airflow, is also introduced into the mixing chamber 2. The introduction of a secondary fluid flow 5 in the mixing chamber 2 further assists mixing the fuel droplets and prevents or minimizes fuel droplets from attaching to the walls of the mixing chamber 2. Preferably, the secondary fluid flow 5 is supplied uniformly around the fuel outlet of the fuel injector 1.

The regulator, or steam/air control, valve 7 also can control the volume and velocity of the secondary fluid flow 5 being introduced into the mixing chamber 2. Accordingly, although referred to in the singular, the regulator, or steam/air control, valve 7 can include one or more valves. To control and adjust the required flow rates for any or all three feed streams 4, 5 or 9, i.e., the liquid fuel 9, the steam flow 4, and the secondary fluid flow 5, a controller 8 can be used. Such controllers 8 are well known to the art and will not be described further herein.

Figure 2:
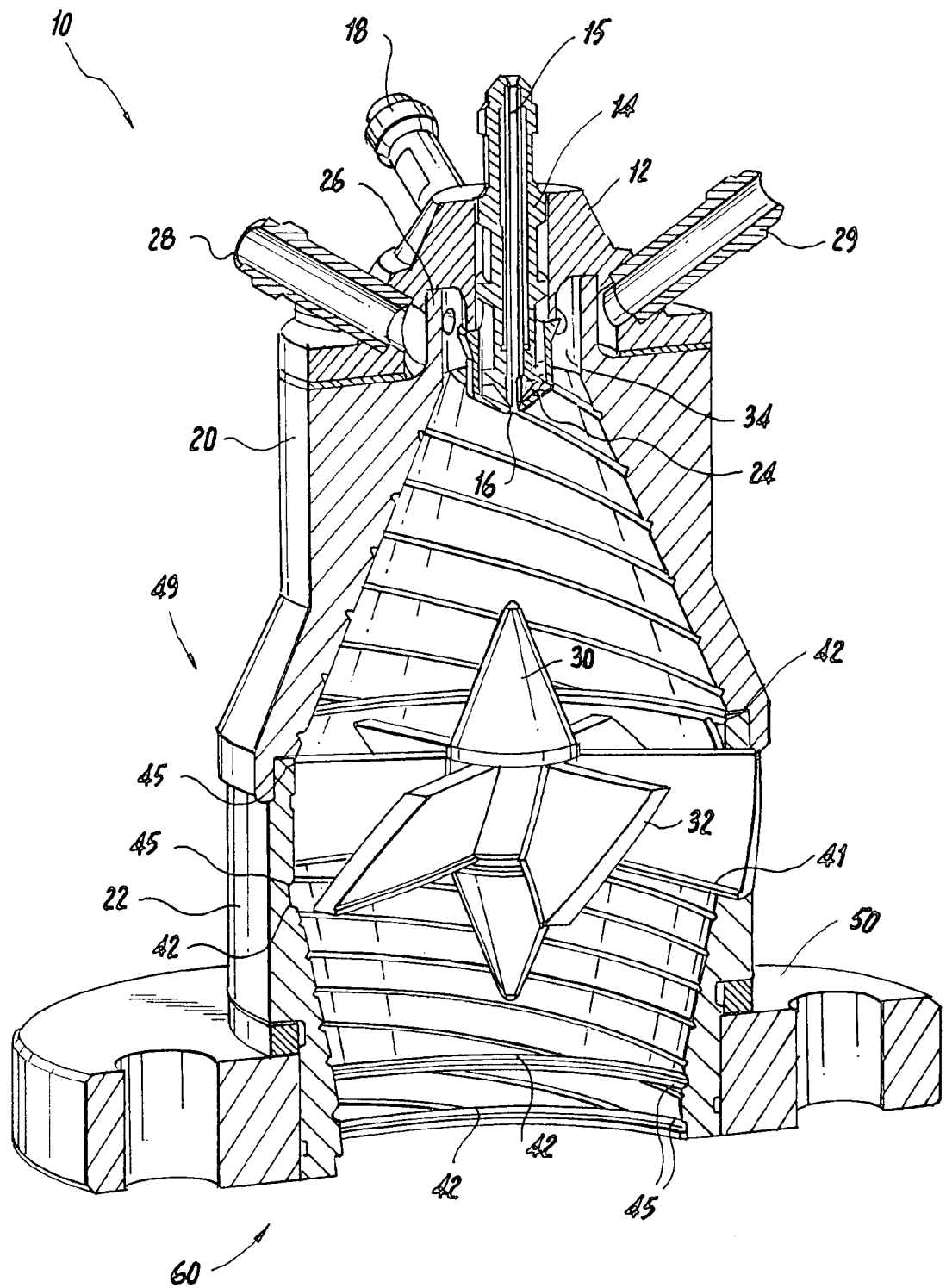
FIG. 2 provides a cut-away view of an illustrative embodiment of an integrated fuel injection and mixing system designed for auto-thermal reformers in accordance with the present invention.

Having described a conventional fuel reformer 10, we will now describe an integrated fuel injection and mixing system 10 according to a first embodiment of the present invention. Referring to FIG. 2, there is shown an integrated fuel injection and mixing system 10 for an auto-thermal-type reformer ("ATR"). Preferably, the embodied injection and mixing system 10 comprises a fuel injector 14 (i.e., an injecting means); a mixing chamber 49 (i.e., a mixing means); and a stabilizing mixer/swirler 30 (i.e., a stabilizing means). The injection system 14 has the ability to atomize liquid hydrocarbon fuels and to achieve complete evaporation and mixing within a short distance at various operating conditions. The mixing chamber 49 introduces a secondary fluid to assist in the mixing operation. Inside the mixing chamber 49, the flow-stabilizing mixer/swirler 30 helps to confine the spray rotating about the center of the mixing chamber 49 to keep the spray from fluttering or biasing towards one side. Furthermore, the fuel injector 1/mixing chamber 49/stabilizing mixer/swirler 30 combination is structured and arranged to supply a uniform or near uniform droplet size, fuel vapor mixture to a catalytic reactor 60, which converts the fuel vapor mixture into a hydrogen-rich gas that, in turn, can be introduced into a fuel cell, e.g., a SOFC.

In one aspect of the first embodiment of the present invention, the fuel injector 14 is a gas-assisted simplex-type injector 14 that is operatively disposed in an injector-housing unit 12. The gas-assisted simplex fuel injector 14 is structured and arranged to aspirate and generate fine droplets of pressurized liquid fuel. In a preferred embodiment the fuel injector 14 is structured and arranged to include both pressure swirl and/or siphoning principles to provide fine fuel droplets with uniform or near uniform size distribution.

The injector-housing unit 12 is structured and arranged to be in communication with or otherwise operatively associated with the mixing chamber 49. Preferably, the injector housing unit 12 is removably attachable and securable to the upper portion 20 of the mixing chamber 49, e.g., using cap screws (not shown), so that the unit 14 can be easily removed for scheduled and unscheduled maintenance or replacement purposes. Those of ordinary skill in the art are familiar with a myriad of ways to attach a fuel injector-housing unit 12 to a mixing chamber 49, all of which are within the scope and spirit of this disclosure.

Figure 3:
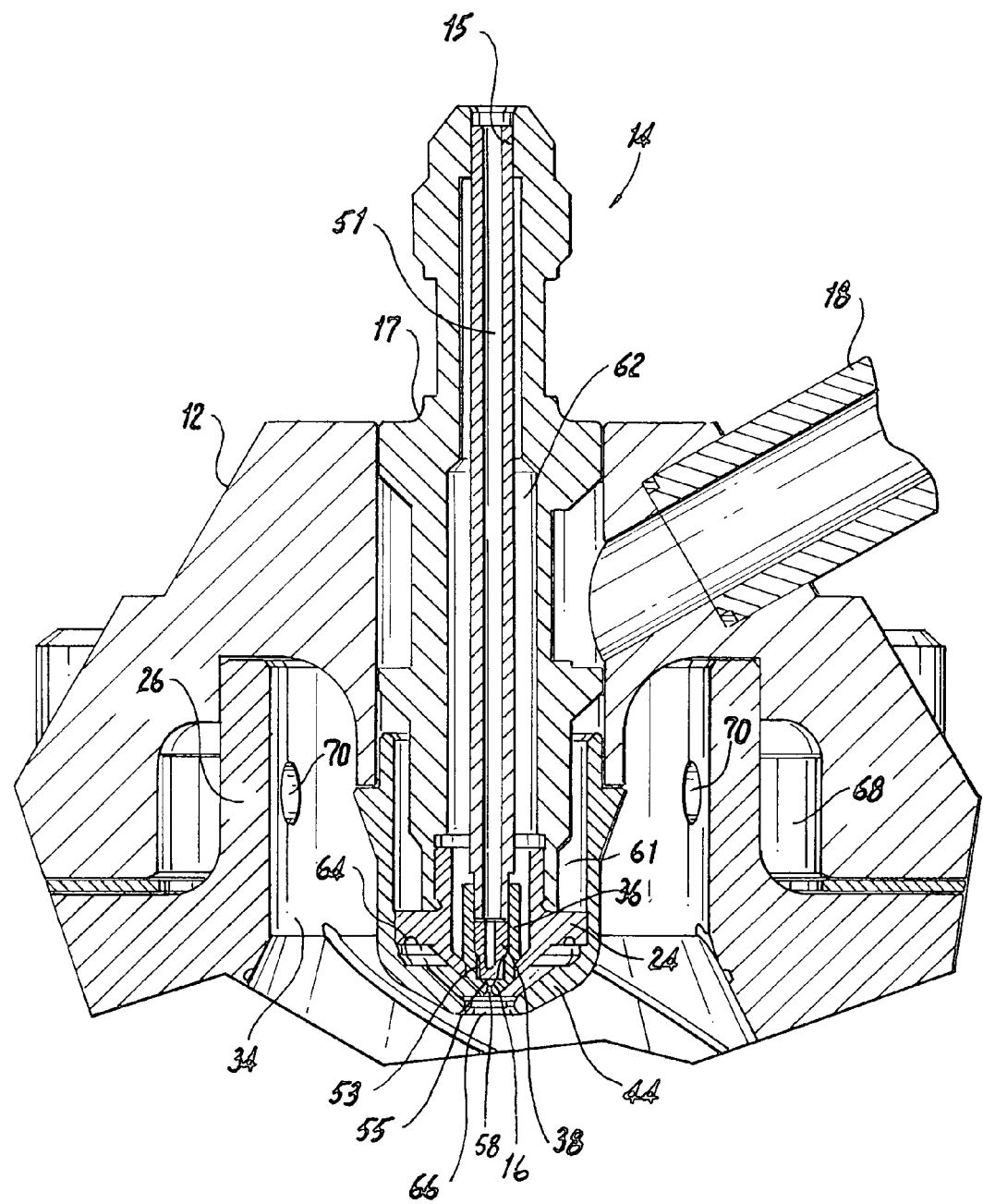
FIG. 3 provides a cross-section view of an illustrative embodiment of a gas-assisted simplex-type injector for the integrated fuel injection and mixing system of FIG. 2.

Referring to FIG. 3, the structure and operation of a preferred embodiment of a fuel injector 14 will now be described. FIG. 3 shows a cross section of a fuel injector 14 that is structured and arranged to employ pressure swirl and siphoning principles to provide fine fuel droplets of uniform or substantially uniform size, i.e., diameter. Preferably, the fuel injector 14, e.g., a gas-assisted simplex injector, includes an injector body 17, a fuel conduit 15, a pressure swirl atomizer tip 16, a gas swirler 24, and an outlet portion 44. In one aspect of the present invention, the fuel injector 14 is structured and arranged at or near the center of the injector-housing unit 12.

In a preferred embodiment, the fuel conduit 15 is structured and arranged in a cavity located in the central portion of the injector body 17. The fuel conduit 15 includes a conduit passage 51 through which a fluid, e.g., a pressurized liquid hydrocarbon fuel, can travel between its proximal and distal ends. An annular space 62 can be provided between the fuel conduit 15 and injector body 17 as a heat shield to protect the liquid fuel from forming carbon deposits. Preferably, the proximal end of the fuel conduit 15 is in communication with a fuel source and the distal end of the fuel conduit 15 is in communication with, i.e., firmly pressed against, a fuel distributor 38 that is structured and arranged inside an orifice cone 36. In one aspect of the present invention, the orifice cone 36 is fixedly attached to, e.g., brazed onto, the distal end of the fuel conduit 15 to form the pressure swirl atomizer tip 16.

Preferably, the pressure swirl atomizer tip 16 is structured and arranged to align with a gas swirler 24 that is provided inside the outlet portion 44 of the fuel injector 14. More preferably, the pressure swirl atomizer tip 16 is structured and arranged to align concentrically with the gas swirler 24.

During fuel injection operation, a liquid hydrocarbon fuel is introduced, e.g., pumped, into the proximal end of the fuel conduit 15 of the fuel injector 14. The liquid fuel travels in the conduit passage 51 the length of the fuel conduit 15 to a distal end, where the liquid fuel is discharged. Preferably, the liquid fuel is discharged as a hollow spray through the pressure swirl atomizer tip 16 into a swirl chamber 55. More preferably, the liquid fuel is forced through the conduit passage 51 of the fuel conduit 15 into an annular space 53 prior to entering the swirl chamber 55 of the fuel distributor 38. Accordingly, under this pressure, liquid fuel exits through the fuel orifice 58 into the gas swirler 24 in the form of a conical sheet.

Once the liquid fuel is discharged into the annular space 53, the fuel sheet encounters and is mixed with an atomizing stream 4, e.g., a high-temperature steam flow or a heated airflow, to enhance fuel atomization and mixing. Referring to FIG. 3, an atomizing gas stream 4, preferably, is introduced into the swirl chamber 55 through an inlet port 18. More preferably, the atomizing gas stream 4 is introduced into an annular passage 61 before entering any of a plurality of spin holes 64 that are structured and arranged inside the gas swirler 24. As the atomizing gas stream 4 emerges from the spin holes 64, the spin holes 64 provide a desired direction to the emerging gas stream 4 so that the atomizing gas stream 4 swirls around the liquid sheet of fuel, generating intense shear forces near the injector final discharge orifice 66. The swirling gas stream and shearing action caused by the atomizing gas stream 4 provide uniform or substantially uniform droplet sizes. It is preferred that the inlet pressure of the atomizing gas stream 4 is at least 1 psig in order to achieve the desired droplet sizes.

Having described the structure and operation of a preferred embodiment of a fuel injector 14, the structure and relational operation of the mixing chamber 49 and stabilizing mixer/swirler 30 of the embodied fuel injection and mixing system 10 will now be described. Referring to FIG. 2, there is shown a mixing chamber 49 that comprises an upper mixing chamber portion 20 (hereinafter the "upper portion 20") and a lower mixing chamber portion 22 (hereinafter the "lower portion 22") that, preferably, are separated or delineated by a stabilizing, centrally-disposed mixer/swirler 30. In a preferred embodiment, the mixer/swirler 30 includes a plurality of vanes 32 or spokes 76 that are fixedly attached to the walls of the mixing chamber 49.

Preferably, the mixing chamber 49 is a divergent-convergent type mixing chamber, which is to say that the upper portion 20 is conically shaped such that the smaller opening of the cone is disposed near the discharge orifice 66 of the fuel injector 14 and the larger opening of the cone is disposed near the stabilizing mixer/swirler 30, i.e., the upper portion 20 diverges. More preferably, the lower portion 22 of the mixing chamber 49 is also conically shaped with the larger opening of the cone disposed near the stabilizing mixer/swirler 30 and the smaller opening of the cone disposed near the catalytic reactor 60, i.e., the lower portion 22 converges.

Figure 7:
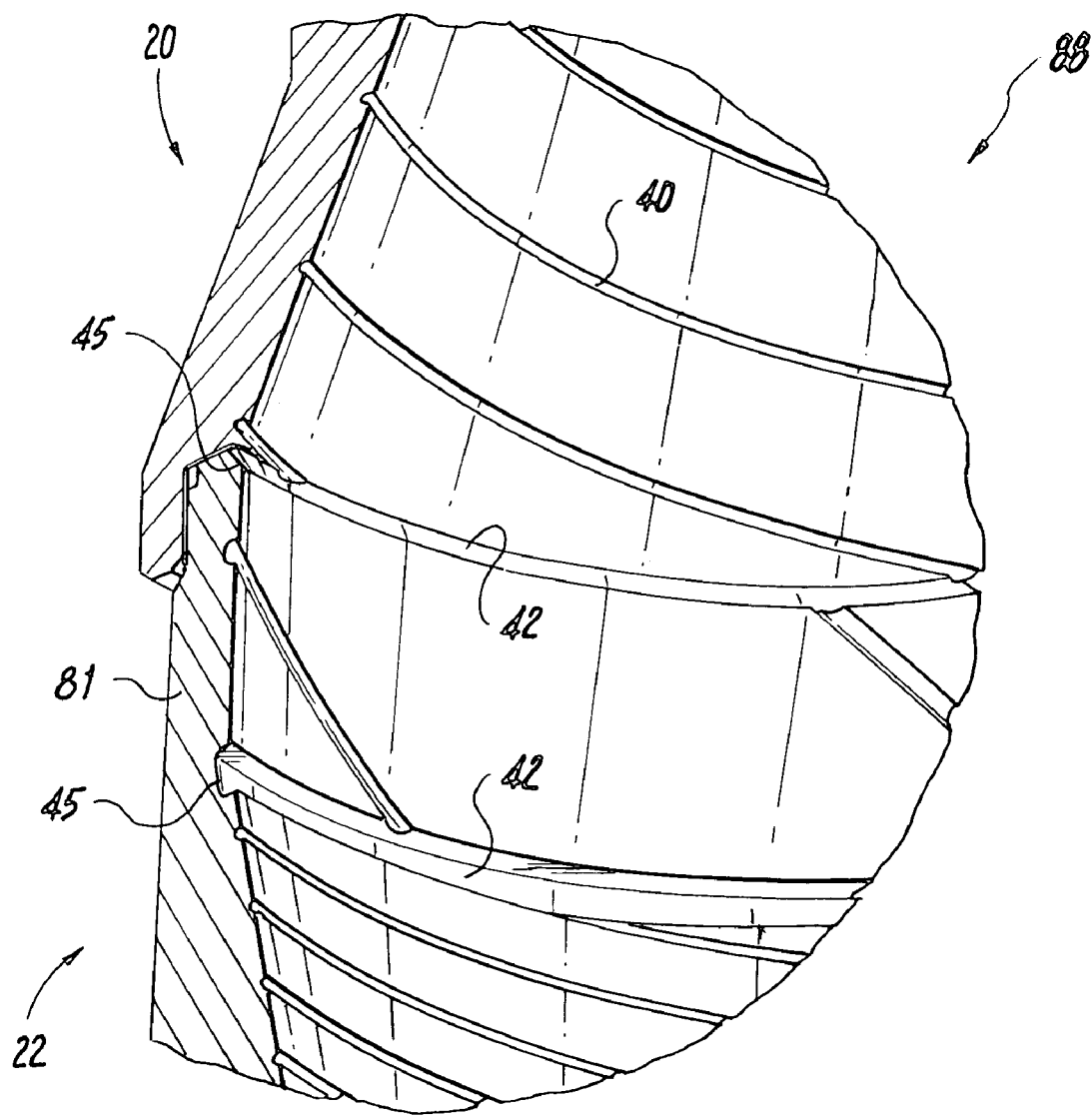
FIG. 7 provides a perspective detail of an illustrative embodiment of the spiral grooves and transition annulus on mixing chamber walls in accordance with the present invention.

Referring to FIGS. 2 and 7, in a preferred embodiment, the upper portion 20 of the mixing chamber 49 is removably attachable and securable to the lower portion 22 of the mixing chamber 49 at a connection region 80. Preferably, a plurality of compatible threadings (not shown) is provided on each of the upper and lower portions 20 and 22 of the mixing chamber 49 so that the upper portion 20 can be screwed onto the lower portion 22. Alternatively, the upper and lower portions 20 and 22 of the mixing chamber 49 can be removably attached and secured by a tight interference fit. Optionally, a gasket ring (not shown) can be used to provide an airtight seal about the connecting region of the upper and lower chambers 20 and 22.

The mixer/swirler 30 is utilized to slow down the high-speed fuel droplets and to redistribute the fuel vapor mixture more uniformly over the entire entrance area of the catalytic reactor 60. As a result, the mixer/swirler 30 enhances the uniformity and homogeneity of the fuel vapor mixture. Furthermore, the flow-stabilizing mixer/swirler 30 helps to confine the atomized spray whirling around the central body, or hub, 39 of mixer/swirler 30, keeping the atomized spray from fluttering or biasing towards one side.

More particularly, as the atomized fuel and feed streams 4 and 5 travel downstream, they encounter the mixer/swirler 30, which redirects the fuel vapor mixture uniformly around the central body, or hub, 39. Because the flow mixer/swirler 30 includes multiple helical vanes 32, it imposes a mild rotation to the surrounding fuel and feed streams 4 and 5, which reduces the flow velocity, resulting in improved mixture uniformity.

The mixer/swirler 30 plays an important role in determining the degree, or completeness, of mixing and uniformity before the feed streams enter the catalytic reactor 60. The mixer/swirler 30 also helps to reduce the droplet velocity that is induced by the high-speed atomizing gas. Depending on the reformer requirements, the mixer/swirler 30 can have various designs, containing different swirling vanes 32 and various swirl directions.

Figure 5:
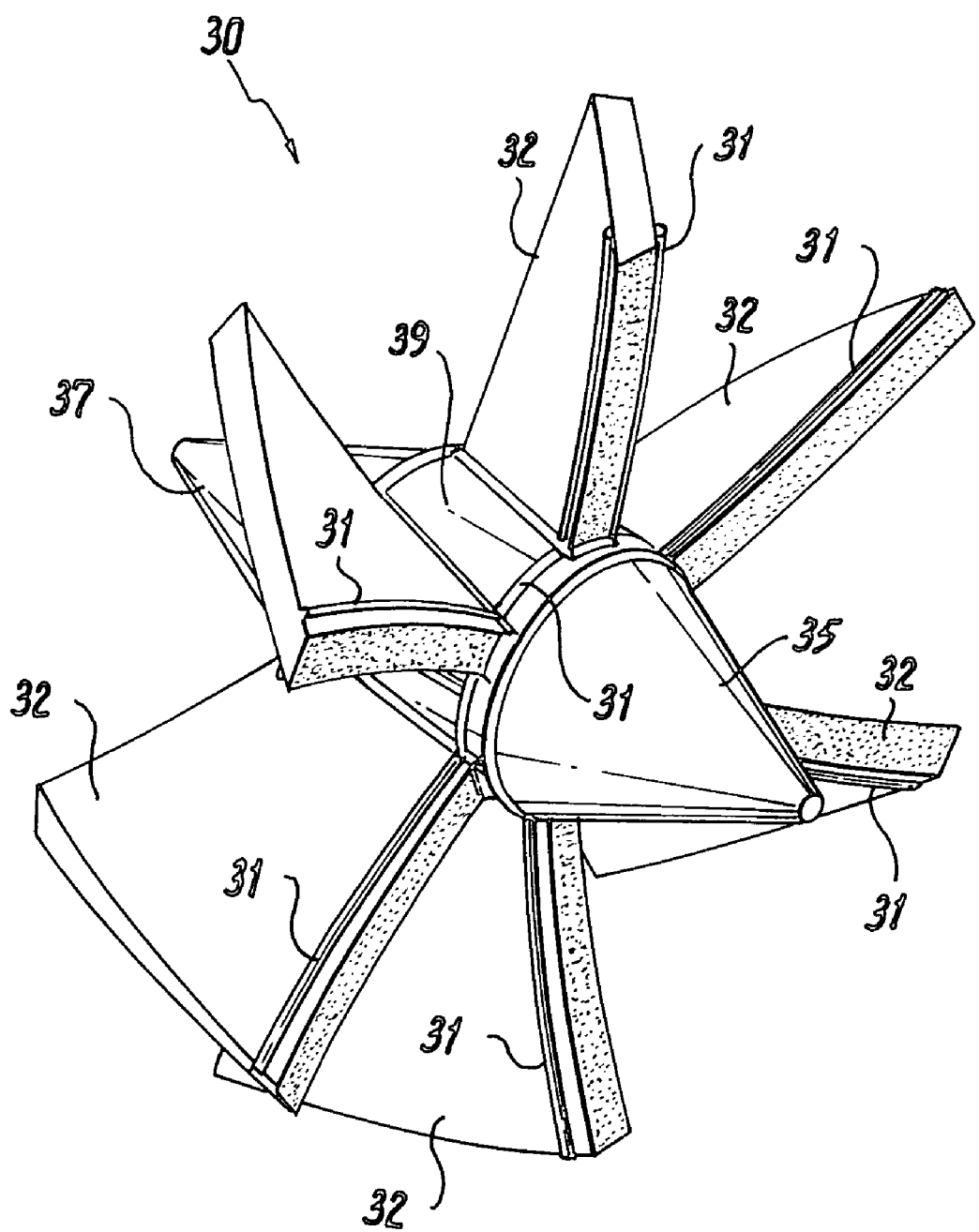
FIG. 5 provides a perspective view of an illustrative embodiment of a single mixer in accordance with the present invention.
Figure 6:
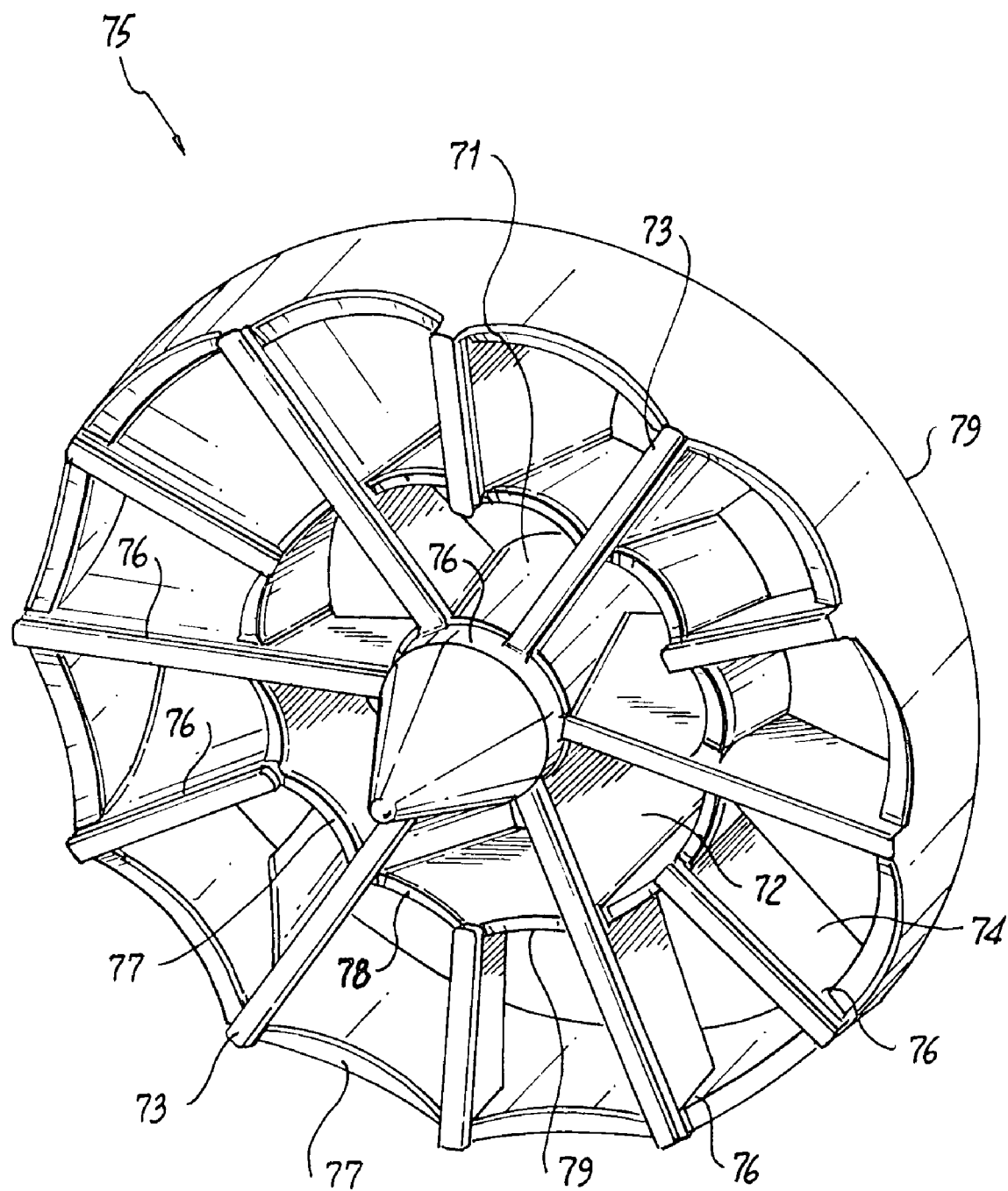
FIG. 6 provides a perspective view of an illustrative embodiment of a double mixer in accordance with the present invention.

FIGS. 5 and 6 provide perspective views of two illustrative mixer/swirler 30 embodiments. FIG. 5 depicts a single-swirler mixer 30 that includes six helical vanes 32 that are fixedly attached to a central hub 39. Conical sections 35 and 37 are attached to the hub 39. The upstream conical section 35 is disposed in the upper portion 20 of the mixing chamber 49 to split or otherwise guide the spray into the gaps between the plurality of helical vanes 32. Splitting or guiding the spray through the helical vanes 32 enhances more uniform distribution of the fuel vapor mixture as it travels towards the catalytic reactor 60. Although the single-swirler mixer 30 in FIG. 5 shows six helical vanes 32, the number of vanes 32 is shown illustratively and the invention is not to be construed as being limited to a six-vaned mixer 30.

The vanes 32 of the mixer/swirler 30 are arranged and oriented to provide a desired swirl direction to the single-swirler mixer 30. Moreover, the vanes 32 are oriented or angled to minimize the creation of vortices downstream of the mixer/swirler, i.e., in the lower portion 22 of the mixing chamber 49. Such vortices can create undesirable local concentrations of droplets, which detract from the desired uniformity of fuel vapor mixture. Consequently, the angle of the vanes 32 should not be too steep. Preferably, an angle less than about 20 degrees is desirable. More preferably, an angle between about 10 degrees and 20 degrees is desirable.

Preferably, the vanes 32 also provide a swirl direction that coordinates with the direction of the atomized fuel spray and feed streams 4 and 5 to achieve optimal performance. Typically, a co-swirling mixer 30, in which the vanes 32 of the mixer 30 are structured and arranged to draw the atomized fuel and feed streams 4 and 5 in the upper portion 20 towards the lower portion 22, minimizes wall wetting. However, a counter-swirling mixer 30, in which the vanes 32 of the mixer 30 are structured and arranged to slow down the atomized fuel and feed streams 4 and 5 in the upper portion 20, provides superior mixing and more uniform droplet size.

Those skilled in the art recognize that the swirl strength of the mixer/swirler 30 needs to be properly adjusted so that vortices and central re-circulation zones are not generated downstream of the mixer/swirler 30. It is also important that a proper distance between the injector 14 and the mixer/swirler 49 is maintained to minimize the potential problem of reversed flow and excess fuel accumulation in the upstream region of the mixer.

FIG. 6 depicts an illustrative embodiment of a double-swirler mixer 75 that further enhances the mixing and uniformity of the feed streams before they enter the catalytic reactor 60. This mixer 75 comprises a plurality of inner swirlers 72 and a plurality of outer swirlers 74. Preferably, the mixer 75 includes a central hub 71 from which a plurality of spokes 73 extends in a radial direction, terminating at an outer periphery 79. Preferably, an inner ring 78 is structured and arranged along each of the plurality of spokes 73 and concentric with the outer periphery 79 and the axis of the hub 71. A plurality of outer vanes 74 is provided between adjacent pairs of spokes 73. The outer vanes 74 are oriented at desired vane angles to provide a desired swirl direction to the mixer 75. Depending on the vane angles and swirl directions, varying degrees of mixing between the feed streams can be easily achieved. As with the single swirler 30 described above, angle of the vanes should not be too steep to avoid vortices and other disturbances. Preferably, an angle less than about 20 degrees is desirable. More preferably, an angle between about 10 degrees and 20 degrees is desirable.

In one aspect of the present invention, each of the plurality of spokes 73 is structured and arranged so that the portion of the spoke 73 between the hub 71 and the inner ring 78 is oriented to provide a desired swirl direction to the mixer 75 and the portion of the spoke 73 between the inner ring 78 and the outer periphery 79 is oriented to provide a desired swirl direction to the mixer 75 that is opposite to that of the portion of the spoke 73 between the hub 71 and the inner ring 78. More preferably, the portion of the spoke 73 between the inner ring 78 and the outer periphery 79 is oriented to provide desired swirl direction to the mixer 75 that is the same as the orientation of the outer vanes 74.

As a result, the inner and outer swirlers 72 and 74 are structured and arranged so that fluid flow counter-rotates. More preferably, inner and outer swirlers 72 and 74 are structured and arranged so that the inner swirlers 72 slow down, i.e., have an opposite swirl direction to, the atomized fuel and feed streams 4 and 5 and the outer swirlers 74 speed up, i.e., have the same swirl direction as, the atomized fuel and feed streams 4 and 5. The counter-rotating arrangement in a double-swirler mixer 75 provides superior performance in terms of mixture uniformity and homogeneity.

Figure 4:
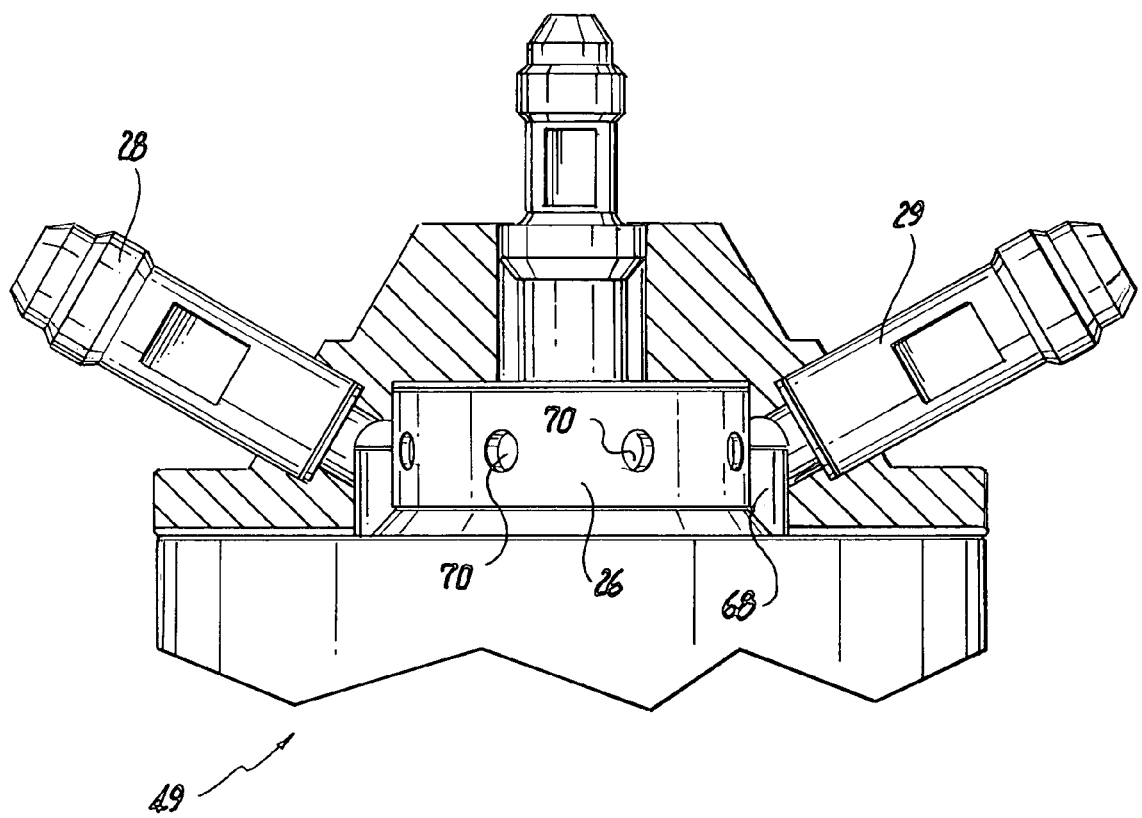
FIG. 4 provides a section view of an illustrative embodiment of an inlet airflow sleeve in accordance with the present invention.

According to one aspect of the present invention, during operation, a heated, secondary fluid flow 5 can be introduced into the upper portion 20 of the mixing chamber 49 to surround the central fuel spray to prevent fuel droplets from adhering to the chamber walls or from accumulating near the corner areas. Preferably, a heated, secondary fluid flow 5 can be introduced into the upper portion 20 of the mixing chamber 49 successively through a plurality of inlet ports 28 and 29 and a special sleeve 26. Although FIGS. 2 and 4 illustrate only two inlet ports 28 and 29, these inlet ports 28 and 29 are shown illustratively and the invention is not to be construed as being limited to two inlet ports. Indeed, more than two or a single port can be used without violating the scope and spirit of this disclosure.

To enhance circumferential uniformity in the mixing chamber 49, a secondary heated fluid flow 5 can be forced through a sleeve 26, e.g., a circular sleeve, having a plurality of angled redistribution openings 70 disposed circumferentially about the sleeve 26. The specially designed sleeve 26 includes distribution holes 70 that redirect the secondary fluid flow 5 to generate a uniform, annular air curtain that surrounds the central spray. This protects the chamber walls from carbon formation.

Preferably, the secondary fluid flow 5 emerges from an annular passage 34, which is enclosed and defined by the sleeve 26, along an axis that is parallel or substantially parallel to the axis of the fuel injector 14. More preferably, the secondary heated fluid flow 5 emerges from an annular passage 34 without diverging or with minimal divergence toward the walls of the upper portion 20 of the mixing chamber 49.

By so directing the secondary heated fluid flow 5 into the mixing chamber 49, the atomized, high-speed fuel spray that emerges from the discharge orifice 66 of the fuel injector 14 immediately entrains the heated fluid flow 5 into the central core of the mixing chamber 49 for intense mixing and vaporization.

For ATR operation, secondary heated fluid flow 5 is supplied through the inlet ports 28 and 29 so that the secondary fluid flow 5 completely surrounds the atomized, high-speed fuel spray uniformly in the circumferential direction. Were this not the case, the direction of travel of the atomized, high-speed fuel spray can deflect, leading to a non-uniform mixture downstream near the catalytic reactor 60. FIG. 4 shows a circular sleeve 26 in communication with or otherwise operatively associated with the upper portion 20 of the mixing chamber 49. The circular sleeve 26 helps provide uniform airflow surrounding the atomized, high-speed fuel spray. Preferably, inlet secondary fluid flow 5 from the inlet ports 28 and 29 can be directed to impinge against the sleeve wall at or near the bottom of the sleeve 26, forcing the secondary fluid flow 5 to circulate around the annular space 68 disposed on the outside of the sleeve 26. Because the pressure of the swirling fluids in the upper portion 20 of the mixing chamber 49 is lower than the pressure of the circulating secondary fluid flow 5, the circulating secondary fluid flow 5 is drawn towards the lower pressure in an upward direction and into the plurality of redistribution holes 70. Preferably, the plurality of redistribution holes 70 are structured and arranged to provide a downward orientation to the secondary fluid flow 5 as it passes through the holes 70 from the annular space 68 into the annular passage 34.

Here again, preferably, the secondary fluid flow 5 emerges from an annular passage 34 along an axis that is parallel or substantially parallel to the axis of the fuel injector 14. More preferably, the secondary heated fluid flow 5 emerges from an annular passage 34 without diverging or with minimal divergence toward the walls of the upper portion 20 of the mixing chamber 49.

Due to the presence of the central mixer/swirler 30, the flow structure within the upper portion 20 of the mixing chamber 49 is very complex. As a result, some atomized fuel vapor droplets can be transported toward the walls of the mixing chamber 49 or accumulate in discrete areas by localized reverse flows, which can lead to a wetted wall condition. If liquid fuel is not quickly evaporated, it can be trapped on the wall surface and likely will become carbon or coke deposits due to the intense heat. To minimize the potential of carbon formation, spiral grooves 40 can be fabricated on the chamber walls to help channel excess fuel. The grooves 40 provide an extended path for the liquid fuel to follow. Because of the extended path, the excess liquid fuel will have adequate residence time to evaporate, significantly improving the reformer efficiency. Most importantly, the excess liquid fuel collected on the chamber walls and mixer surfaces will not randomly drip or drop onto or into the catalytic reactor 60, which creates undesirable temperature gradients. Not only do the spiral grooves 40 assist droplet evaporation, but they also help stabilize the rotating mixture within the chamber 49 like the rifling in the barrel of a rifle. Preferably, the configuration of the spiral grooves 40 are structured and arranged in such a way that they can tolerate the carbon deposits without significantly influencing the mixing process and reformer operation.

Accordingly, in a preferred embodiment, to provide an extended evaporation time for fuel droplets that may collect on the wall surfaces, the present invention includes providing spiral grooves 40 on the wall faces of the upper and lower portions 20 and 22 of the mixing chamber 49 and/or on the wall face of the transition portion 81 of the stabilizing mixer/ swirler 30. Alternatively, brazed wires can be used instead of or in combination with the spiral grooves 40. Hereinafter, "grooves 40" associated with the surface of the walls of the upper and lower portions 20 and 22 of the mixing chamber 49 will also refer to brazed wire or some combination of brazed wires and grooves.

Preferably, the grooves 40 are formed on the wall surfaces of the upper and lower portions 20 and 22 of the mixing chamber 49 in a spiral pattern to provide gutters or fuel guiding channels. The grooves 40, which are provided below the surface of the walls of the upper and lower portions 20 and 22, can be structured and arranged such that carbon formation and liquid fuel collection is allowed on the wall surfaces; however, their presence will not affect the performance of the injection and mixing system 10 for an extended period of time. Preferably, the fuel draining grooves 40 are prepared in multiple spiral paths with a cross sectional shape of a half-circle. However, it would achieve the same purpose to cut the spiral grooves 40 in a triangular shape, rectangular shape, trapezoidal shape, or any other shape. Due to their complexity, however, it may be difficult to carve or otherwise fashion spiral grooves 40 or channels on the chamber walls using conventional machining methods. Under such a circumstance, it would be preferred to use either rapid prototype investment casting process or to braze thin wires 31 on the wall surfaces to form the guiding passage for draining the excess fuel.

Because fuel droplets can also accumulate of on the mixer/swirler 30, the spiral or fuel drainage grooves 40 can also be incorporated on the mixer/swirler 30 to minimize the potential of carbon formation on the surfaces of the center body 39, conical sections 35 and 37, and/or the swirler vanes 32. Preferably, with the mixer/swirler 30, the fuel draining grooves 40 are prepared in multiple spiral paths with a cross sectional shape of a half-circle. However, it would achieve the same purpose to cut the spiral grooves 40 in a triangular shape, rectangular shape, trapezoidal shape or any other shape. Due to their complexity, however, it may be difficult to carve or otherwise fashion spiral grooves 40 or channels on the mixing chamber 49 walls using conventional machining methods. Under such a circumstance, it would be preferred to use either rapid prototype investment casting process or to braze thin wires 31 on the wall surfaces to form the guiding passage for draining the excess fuel.

Referring to FIG. 7, there is shown a detail view of an illustrative embodiment of anti-drooling, anti-carboning spiral grooves 40, including a plurality of transition channels 42 that are structured and arranged in the transition region 81 associated with the upper and lower portion 20 and 22 of the mixing chamber 39. In FIG. 7, there are several transition channels 42 where, instead of a spiral groove 40, a full annulus 45 is provided around the circumference of the lower portion 22 to redistribute the excess liquid fuel around the chamber walls before continuing the journey downstream. Preferably, two transition channels 42 and two annuli 45 are disposed at the upstream and the downstream edge of the transition region 81 as shown in FIG. 7. More preferably, the width of the transition channels 42 is greater than that of the spiral grooves 40 so that carbon deposit can be tolerated in these areas.

In general, it is preferred that spiral grooves 40 are cut on the inside chamber walls and/or the exterior surfaces of the central body 39, swirler vanes 32, and or conical section 35 and 37. However, from a manufacturing standpoint, it may be easier to braze thin wires 31 onto the exterior surface of the vanes 32 of the mixer/swirler 30 to form the draining passages for draining the excess fuel. As illustrated in FIG. 5, thin wires 31 can be brazed near the bottom of the center body 39 and swirler vanes 32 for anti-drooling purposes.

FIG. 6 illustrates a mixer/swirler 75 with more complex configuration that is made by an investment casting process. Integral grooves 76 and concave scallops 77 serve to channel excess fuel. If excess fuel collects on the mixer/swirler 75 during reformer operation, it will be drained toward the chamber walls along a tapered trailing edge at the bottom of the swirler vanes 74. The trailing edge of the swirler vanes 74 is preferably tapered at least about 10 degrees, preferably less than about 20 degrees, and, more preferably, between about 10 and about 20 degrees, creating a natural push for excess fuel to move toward the chamber walls.

In a second embodiment, the present invention provides an integrated fuel injection and mixing system that is structured and arranged for use with other fuel reformer types. For example, the embodied integrated fuel injection and mixing system can be modified for compatibility with either a steam-type reformer (SR) or a catalytic partial oxidation-type (CPOX) reformer, by providing two feed streams to the injector unit. Moreover, those of ordinary skill in the art will realize that, slight modification can be made to the injector outlet cone 44 described in FIG. 3 for ATR applications to adapt the injection system to meet operational requirements for SR or CPOX reformers.

Figure 8:
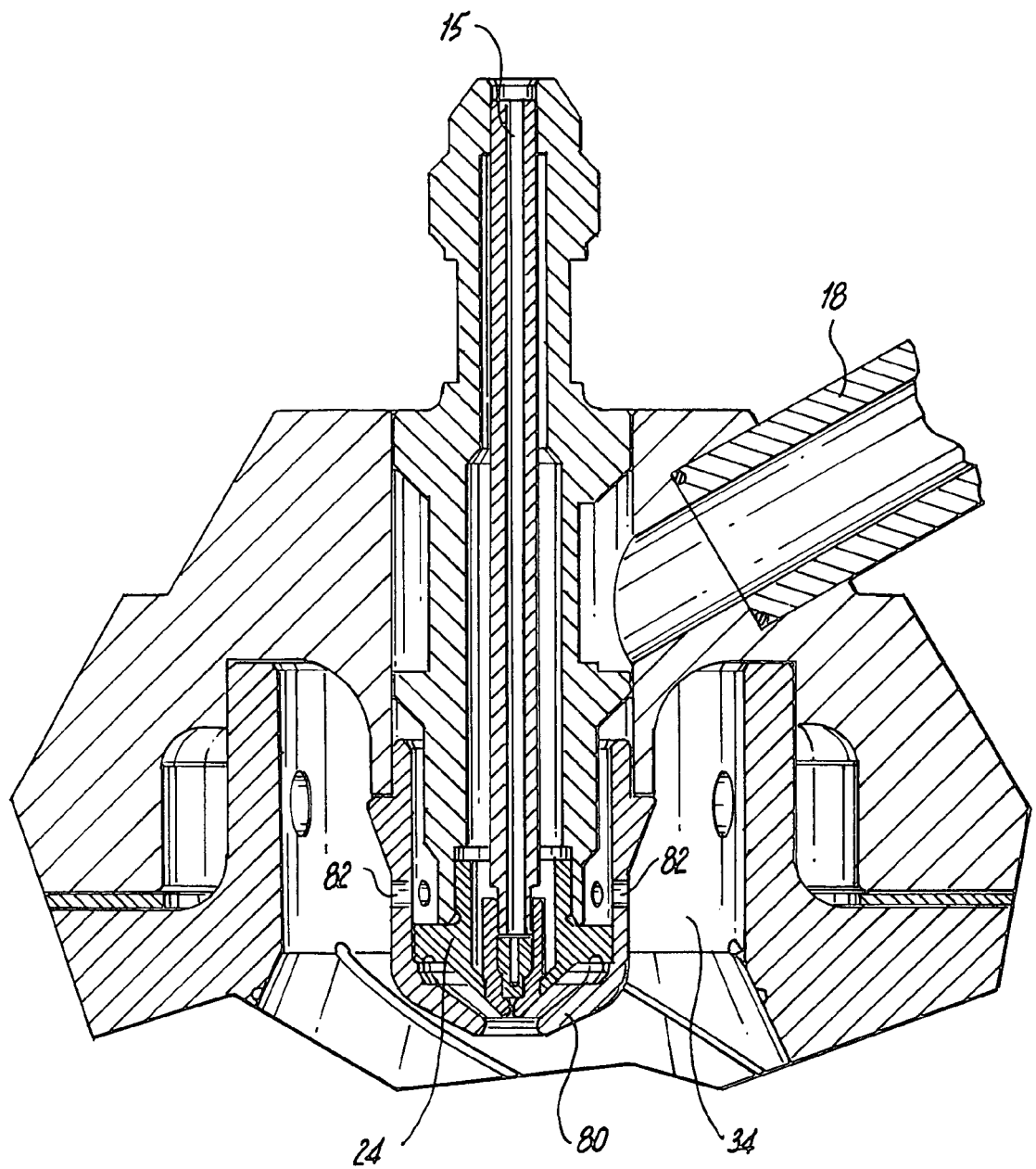
FIG. 8 provides a cross section view of an alternative embodiment of a gas-assisted simplex-type injector designed for steam-type reformers or catalytic partial oxidizing-type reformers.

For example, FIG. 8 shows an illustrative embodiment of a fuel injector that could be used for the steam-type or catalytic partial oxidation-type reformers. As with the ATR reformer, liquid hydrocarbon fuel can be introduced into the injector 10 through a fuel conduit 15 and an atomizing gas stream 4 can be introduced through the inlet port 18. Preferably, the atomizing gas steam 4 for the SR reformer is superheated steam and the atomizing gas stream 4 for the CPOX reformer is heated airflow.

The outlet cone 80 for steam-type and catalytic partial oxidation-type reformers, are structured and arranged to allow excess gas streams to bleed into the annular passage 34 for mixing and wall protection purposes. Accordingly, multiple bleed holes 82 can be provided through the outlet cone 80 located upstream of the gas swirler 24. For SR and CPOX operation, the inlet ports 28 and 29 are disposed on the injector-housing unit 12 and are only used for injector and reformer warm-up purposes.

In a preferred embodiment, fuel injectors 14 provide fuel droplet sizes that are smaller than about 30 µm at all operating conditions. However, there are very few injection methods that can meet this requirement without incorporating preheating devices. Siphon injection, which is well known to those of ordinary skill in the art, is one of the few injection concepts that can produce extremely fine droplets without a preheating device. Therefore, a fuel injection and mixing system using just siphon principles is particularly useful to eliminate a fuel pump or when there is very limited fuel pressure available in the system.

Figure 9:
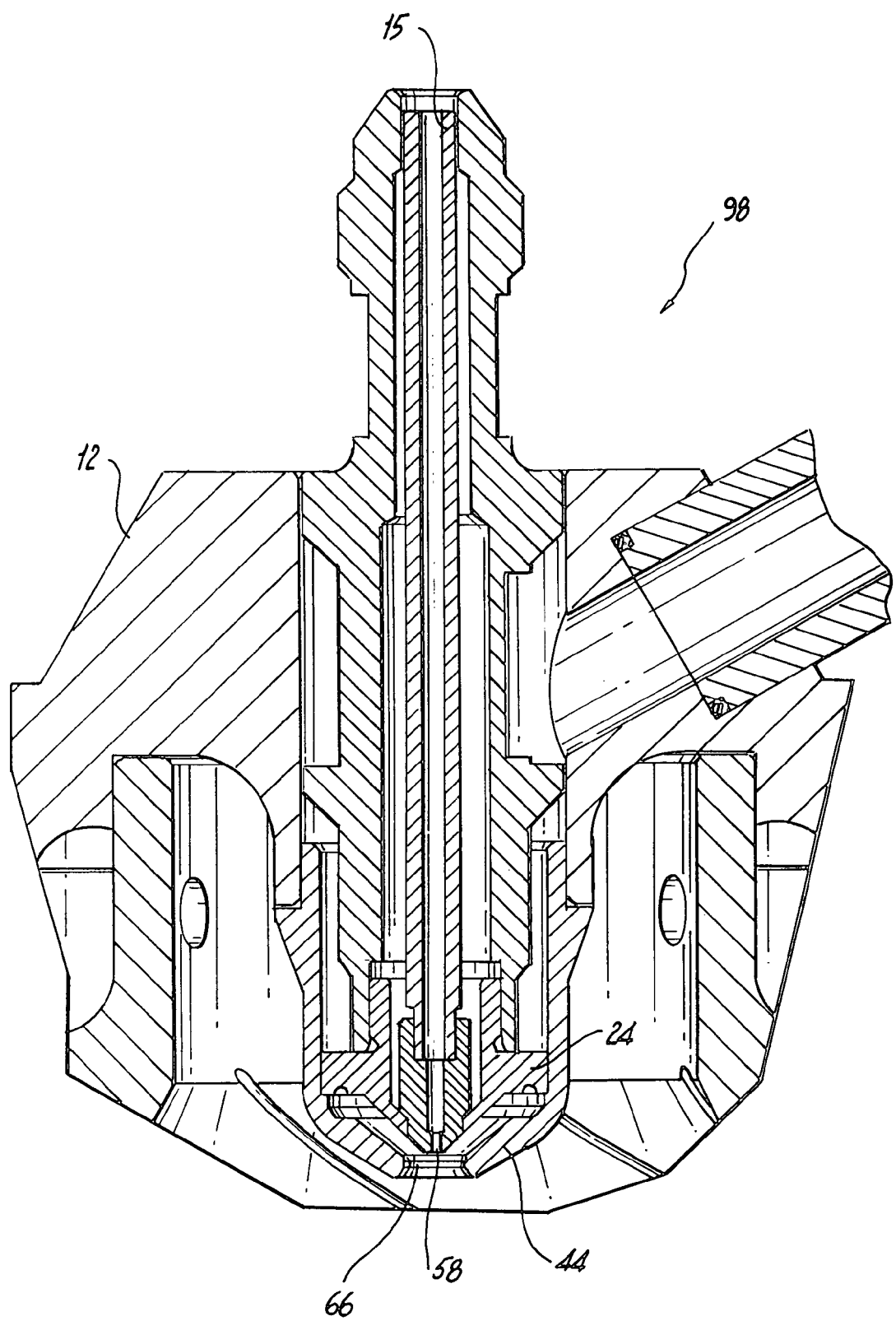
FIG. 9 shows a cross section view of an illustrative embodiment of a siphon-type injector that could be used in accordance with the present invention.

FIG. 9 illustrates an illustrative embodiment of a fuel injector that utilizes only the principle of a siphon injector 98. This injector 98 consists of a simple straight tube 15 with a discharge orifice 58 located inside of a gas swirler 24. Liquid fuel can be supplied through a fuel conduit 15 that is in communication with, and, preferably, in direct communication with, a fuel discharge orifice 58. A pressure differential between the liquid fuel inside the fuel conduit 15 and the atomizing gas stream 4 in the gas swirler 24 produces a vacuum to siphon fuel out of the conduit 15 through the discharge orifice 58. More specifically, the atomizing gas streams 4 are forced through the spin holes 64 on the swirler 24 to form a low-pressure vortex in front of the orifice 58. As a result of the differential pressure, liquid fuel is siphoned out of the central orifice 58 to produce extremely fine droplets with uniform distribution. Intense mixing and atomization with an atomizing gas stream 4 take place inside the outlet cone 44 before emerging from the final discharge orifice 66.

The embodied siphon-type injector 98 is simple in structure and easy to manufacture. The fuel flow rates of the siphon injector 98, however, are strongly dependent on the inlet pressures of the atomizing gas stream 4. Accordingly, although low fuel turndown ratio may be a limiting factor for a siphon-type injector 98, it will meet the performance requirements of low power fuel reformer systems.

Figure 10A:
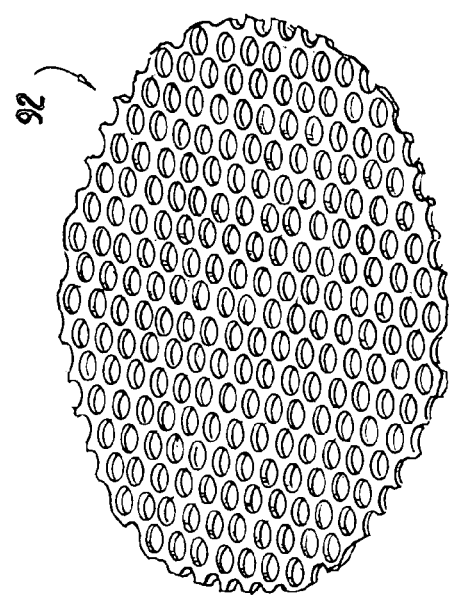
FIG. 10 and FIG. 10(*a*) provide a cross section view of an illustrative embodiment of a mixing chamber that incorporates a stack of mesh screens for enhanced mixing capability and flow uniformity in accordance with the present invention and a mesh screen, respectively.
Figure 10:
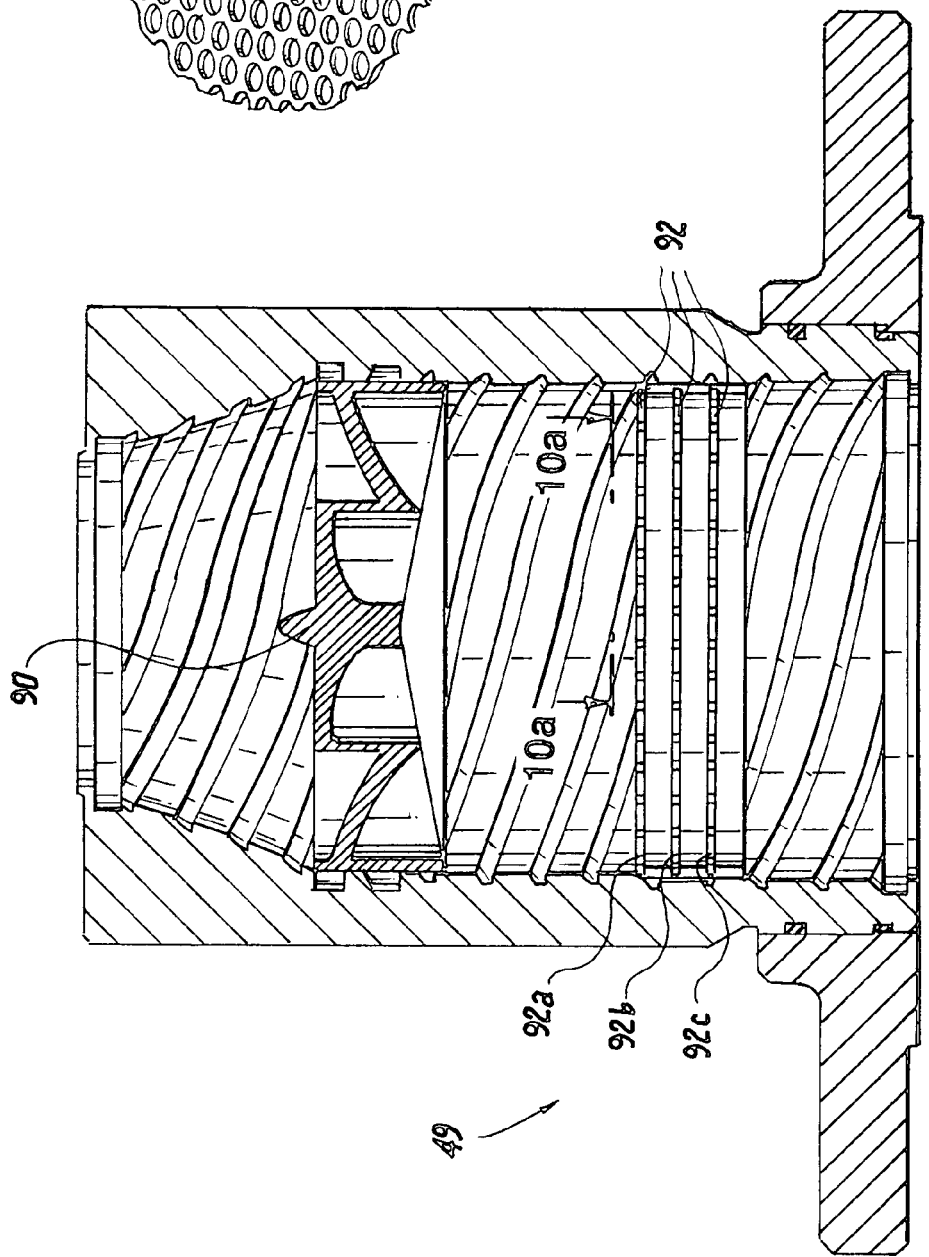

Referring to FIG. 10, another modification to a fuel injection and mixing system will be described. FIG. 10 provides an illustrative embodiment of a mixing chamber 49 that combines a double-swirler mixer 90 with a plurality, i.e., a stack, of mesh screens 92. The optional addition of mesh screens 92 further enhances the uniformity of the fuel vapor mixture. Moreover, mesh screens 92 are very effective in redistributing the fuel vapor mixture more evenly near the reactor 60 entrance area.

In one aspect of the present invention, the mesh screens are made of a heat and corrosion resistant material, e.g., stainless steel and other alloys. The shape of the openings in the mesh can include circular, rectangular, trapezoidal, and any other geometric shape commercially available. Likewise, the size of the openings can be selected from what is commercially available. Those of ordinary skill in the art appreciate that the size and number of openings affect porosity and that porosity is inversely related to mixing, i.e., the lower the porosity, the greater the mixing. Disadvantageously, however, the lower the porosity, the great the pressure loss through the entire fuel injection and mixing system. As a result, skilled artisans will have to balance these two affects to provide the most desirable combination of mesh screens for a particular purpose.

Although there are three mesh screens 92 shown in FIG. 10, the invention is not to be construed as being limited thereto. Indeed, those of ordinary skill in the art will appreciate that the number and porosity of the mesh screens 92 can be selected to satisfy mixing chamber pressure drop requirements. For example, to achieve optimum mixing performance, it is preferable to use at least two mesh screens 92 with a total porosity of 60% or less. However, the invention is not to be construed as being limited thereto.

Figure 11:
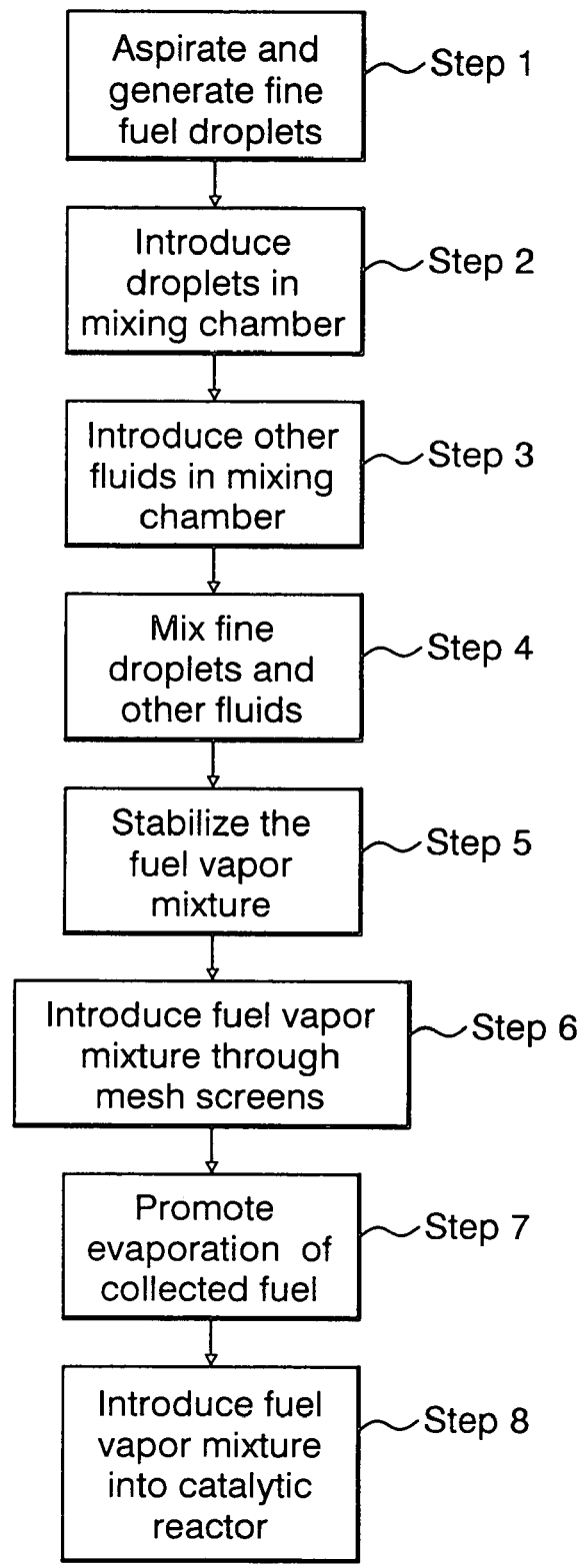
FIG. 11 provides a flow chart of a preferred method of providing a homogenous fuel vapor mixture to a catalytic reactor to provide a hydrogen-rich gas.

In one aspect of the present invention, the porosity of a single mesh screen 92 can be from about 30 percent to about 80 percent. When a plurality of mesh screens 92 are used, the porosity of the screens can vary or can be the same. For example, for a three mesh screen 92 system, the uppermost and lowermost screens 92a and 92c can have porosities of 60 percent and the inner screen 92b can have a porosity of 40 percent. Those of ordinary skill in the art will appreciate the myriad combinations of screen porosities and the number of screen to achieve a desired Having described several embodiments of fuel injection and mixing chambers, methods of providing a homogenous fuel vapor mixture to a catalytic reactor to provide a hydrogen-rich gas to, e.g., a fuel cell, will now be described. FIG. 11 provides a flow chart of an embodied method. Preferably, the method comprising the steps of aspirating and generating fine fuel droplets of a liquid fluid (STEP 1); introducing the fine fuel droplets into a mixing chamber (STEP 2); introducing one or more other fluids, e.g., heated airflow and/or steam flow, into the mixing chamber (STEP 3) to enhance atomization of the fuel droplets; mixing the one or more other fluids with the fine fuel droplets to provide a fuel vapor mixture (STEP 4); and stabilizing the fine vapor mixture in the mixing chamber using a swirler/mixer (STEP 5). The fuel vapor mixture can then be introduced into the catalytic reactor (STEP 8) where it can be converted into a hydrogen-rich gas, which can be used as fuel for a fuel cell.

Preferably, the step of aspirating and generating fine fuel droplets of a liquid fluid (STEP 1) includes aspirating and generating fine fuel droplets of a uniform size. More preferably, the step of aspirating and generating fine fuel droplets of a liquid fluid includes using siphoning principles and/or pressure swirling techniques to generate the fine fuel droplets.

In one aspect of the present invention, the step of introducing the fine fuel droplets into a mixing chamber (STEP 2) includes introducing the fine fuel droplets into the mixing chamber at very high speed. More preferably, the step of introducing the fine fuel droplets into a mixing chamber (STEP 2) includes introducing the fine fuel droplets in a liquid sheet or liquid conical sheet.

In a preferred embodiment, the step of introducing one or more other fluids into the mixing chamber (STEP 3) includes introducing the one or more other fluids uniformly around the fine fuel droplets as they first enter the mixing chamber. Preferably, the one or more fluids are either heated airflow or steam flow or a combination of the two.

In another aspect of the present invention, the step of mixing the one or more other fluids with the fine fuel droplets (STEP 4) further includes introducing a secondary fluid into the mixing chamber to enhance uniform mixture of the fine fuel droplets and the one or more other fluids. More preferably, the step of introducing a secondary fluid includes introducing at least one of heated air and steam flow into the mixing chamber.

Preferably, the step of stabilizing the homogenous fuel vapor mixture (STEP 5) includes slowing down the high-speed homogenous fuel vapor mixture using a swirler/mixer. More preferably, the step of stabilizing the homogenous fuel vapor mixture (STEP 5) includes redistributing the fuel mixture uniformly over an entrance area of the catalytic reformer.

Optionally, the method can further includes the step of introducing the fuel vapor mixture through a mesh system to improve the uniformity of said fuel vapor mixture (STEP 6). As provided in greater detail above, the mesh system further enhances the uniformity of the fuel vapor mixture. Furthermore, optionally, the method also can include promoting evaporation of any fuel that accumulates on the walls of the mixing chamber or outer surface of the mixer/swirler (STEP 7). In a preferred embodiment, STEP 7 includes providing one or more channels or paths along an inner surface of the mixing chamber and/or the outer surface of the mixer/swirler (STEP 7). The channels or paths, e.g., at least one of one or more spiral grooves or one or more brazed wires, provide a gutter or passage to channel fuel droplets that may collect on the inner surface of the mixing chamber or the outer surface of the mixer/swirler. The extended path provided by the channels or paths promotes further evaporation of the fuel droplets. The fuel vapor mixture can then be introduced into the catalytic reactor (STEP 8) where it can be converted into a hydrogen-rich gas, which can be used as fuel for a fuel cell.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. An integrated fuel injection and mixing system for atomizing and mixing a liquid fluid for introduction into a fuel reformer, the system comprising:

a fluid injector, having an injector tip, for generating fine droplets of the liquid fluid under pressure;

a mixing chamber that is in communication with an outlet at the injector tip of the fluid injector for atomizing and mixing the fine droplets of liquid fluid from said fluid injector with a second fluid to provide a fuel vapor mixture, wherein the mixing chamber has a diverging upper portion and a converging lower portion; and a mixer/swirler disposed in a central portion of the mixing chamber and comprising a plurality of vanes positioned in the central portion between the diverging upper portion and the converging lower portion of the mixing chamber, wherein the mixer/swirler is structured and arranged in the mixing chamber for stabilizing the fuel vapor mixture prior to introduction of the fuel vapor mixture through an entrance to the fuel reformer.

2. The system as recited in claim 1, wherein the fuel reformer is selected from the group comprising a steam reformer, an auto-thermal reformer, and a catalytic partial oxidation reformer.

3. The system as recited in claim 1, wherein the fluid injector comprises a simplex injector.

4. The system as recited in claim 1 wherein the fluid injector is a siphon injector.

5. The system as recited in claim 1, wherein the fluid injector is gas assisted to aspirate and generate fine fuel droplets.

6. The system as recited in claim 1, wherein the fluid injector uses at least one of siphoning principles and pressure swirling techniques to generate fine fuel droplets.

7. The system as recited in claim 1, wherein the fine droplets enter the mixing chamber at a high speed.

8. The system as recited in claim 1, wherein the second fluid includes heated airflow or superheated steam flow.

9. The system as recited in claim 8, wherein the heated airflow or superheated steam flow is supplied uniformly around the injector tip of the fluid injector.

10. The system as recited in claim 1, wherein the mixer/swirler stabilizes the fuel vapor mixture by slowing down high-speed droplets of liquid fuel to provide better mixing and a more uniform droplet size.

11. The system as recited in claim 1, wherein the mixer/swirler stabilizes the fuel vapor mixture by redistributing high-speed droplets of liquid fuel uniformly over the entire entrance area of the fuel reformer.

12. The system as recited in claim 1, wherein the mixer/swirler is selected from a group comprising a single swirler that can provide co-swirling and counter-swirling action and a double swirler.

13. The system as recited in claim 12, wherein the double swirler comprises a plurality of inner swirlers that include one or more vanes that can provide a desired swirl direction and a plurality of outer swirlers that include one or more vanes that can provide another desired swirl direction.

14. The system as recited in claim 13, wherein the desired swirl direction of the plurality of outer swirlers is opposite that of the swirl direction of the plurality of inner swirlers.

15. The system as recited in claim 1, wherein the system further comprises one or more mesh screens configured to enhance the uniformity of the fuel vapor mixture and evenly redistribute the fuel vapor mixture at the exit of the mixing chamber.

16. The system as recited in claim 1, wherein the mixing chamber is structured and arranged with one or more anti-drooling/anti-carbon grooves to provide a path for any fluid collecting on an interior surface of the mixing chamber to follow, providing an extended evaporation time to said fluid.

17. The system as recited in claim 1, wherein the mixing chamber is structured and arranged with one or more brazed wires to provide a path for any fluid collecting on an interior surface of the mixing chamber to follow, providing an extended evaporation time to said fluid.

18. The system as recited in claim 1, wherein the mixer/swirler is structured and arranged with one or more anti-drooling/anti-carbon grooves to provide a path for any fluid collecting on a surface of the mixer/swirler to follow, providing an extended evaporation time to said fluid.

19. The system as recited in claim 1, wherein the mixer/swirler is structured and arranged with one or more brazed wires to provide a path for any fluid collecting on an interior surface of the mixer/swirler to follow, providing an extended evaporation time to said fluid.

20. A method of providing a homogenous fuel vapor mixture to a catalytic reactor, the method comprising the steps of:

aspirating and generating fine fuel droplets of a liquid fluid in a fluid injector having an injector tip;

introducing the fine fuel droplets into a mixing chamber in communication with an outlet at the injector tip, the mixing chamber having a diverging upper portion, a central portion, a converging lower portion, and a mixer/swirler comprising a plurality of vanes positioned in the central portion between the diverging upper portion and converging lower portion;

introducing one or more other fluids into the mixing chamber to enhance atomization of the fine fuel droplets;

mixing the one or more other fluids with the fine fuel droplets to provide the homogenous fuel vapor mixture; and stabilizing the homogenous fuel vapor mixture through the mixing chamber.

21. The method as recited in claim 20, wherein the step of aspirating and generating fine fuel droplets of a liquid fluid includes aspirating and generating fine fuel droplets of a uniform size.

22. The method as recited in claim 20, wherein the step of aspirating and generating fine fuel droplets of a liquid fluid comprises using at least one of siphoning principles and pressure swirling techniques to generate the fine fuel droplets.

23. The method as recited in claim 20, wherein the step of introducing the fine fuel droplets into a mixing chamber includes introducing the fine fuel droplets into the mixing chamber at high speed.

24. The method as recited in claim 20, wherein the step of introducing one or more other fluids into the mixing chamber includes introducing the one or more other fluids uniformly around the fine fuel droplets as they first enter the mixing chamber.

25. The method as recited in claim 20, wherein the step of introducing one or more other fluids into the mixing chamber includes introducing at least one of heated air and steam flow into the mixing chamber.

26. The method as recited in claim 20, wherein the step of stabilizing the homogenous fuel vapor mixture includes slowing down the high-speed homogenous fuel vapor mixture using a swirler/mixer.

27. The method as recited in claim 20, wherein the step of stabilizing the homogenous fuel vapor mixture includes redistributing the fuel mixture uniformly over an entrance area of the catalytic reformer.

28. The method as recited in claim 20, wherein the method further includes the step of introducing the fuel vapor mixture through a mesh system to improve the uniformity of said fuel vapor mixture.

29. The method as recited in claim 20, wherein the method further includes the step of promoting evaporation of any fuel droplets that accumulate on any surface of the mixing chamber or a mixer/swirler.

30. The method as recited in claim 20, wherein the step of promoting evaporation of any fuel droplets that accumulate on any surface of the mixing chamber or a mixer/swirler includes providing one or more channels or paths along any exposed surface of the mixing chamber or any exposed surface of the mixer/swirler to channel fuel droplets that collect on said surfaces to promote further evaporation of said fuel droplets.

31. The method as recited in claim 30, wherein the step of providing one or more channels or paths along an inner surface of the mixing chamber includes providing at least one of one or more spiral grooves or one or more brazed wires.

32. The method as recited in claim 20, wherein the step of mixing the one or more other fluids with the fine fuel droplets to provide the homogenous fuel vapor mixture includes introducing a secondary fluid into the mixing chamber to enhance uniform mixture of the fine fuel droplets and the one or more other fluids.

33. The method as recited in claim 32, wherein step of introducing a secondary fluid includes introducing at least one of heated air and steam flow into the mixing chamber.

34. An integrated fuel injection and mixing system for providing a homogenous vapor mixture prior to introduction of the vapor into a catalytic reformer, the system comprising:
- a fluid injector, having an injector tip, for generating fine droplets of the liquid fluid;
- a mixing chamber that is in communication with an outlet at the injector tip of the fluid injector for mixing the fine droplets of liquid fluid from said fluid injector with other fluids to provide a fuel mixture, wherein the mixing chamber has a diverging upper portion and a converging lower portion; and
- a mixer/swirler disposed in a central portion of the mixing chamber and comprising a plurality of vanes positioned in the central portion between the diverging upper portion and the converging lower portion of the mixing chamber, wherein the mixer/swirler is structured and arranged in the mixing chamber for stabilizing the homogenous vapor mixture prior to introduction of the homogenous vapor mixture into the catalytic reformer.

35. An integrated fuel injection and mixing system for atomizing and mixing a liquid fluid for introduction into a fuel reformer, the system comprising:
- a injection means, having an injector tip, for generating fine droplets of the liquid fluid;
- a mixing means that is in communication with an outlet at the injector tip of the injection means for atomizing and mixing the fine droplets of liquid fluid from said injection means with a second fluid to provide a fuel vapor mixture, wherein the mixing means includes a diverging upper portion and a converging lower portion; and
- a swirling means disposed in a central portion of the mixing means and comprising a plurality of vanes positioned in the central portion between the diverging upper portion and the converging lower portion of the mixing chamber, wherein the swirling means is structured and arranged in the mixing means for stabilizing the fuel vapor mixture prior to introduction of the fuel vapor mixture through an entrance to the fuel reformer.

36. A fuel reformer for reforming a liquid fuel into a hydrogen-rich fluid, the reformer comprising:
- an integrated fuel injection and mixing system for atomizing and mixing a liquid fluid for introduction into the fuel reformer, the system including:
  - a fluid injector, having an injector tip, for generating fine droplets of the liquid fluid under pressure;
  - a mixing chamber that is in communication with an outlet at the injector tip of the fluid injector for atomizing and mixing the fine droplets of liquid fluid from said fluid injector with a second fluid to provide a fuel vapor mixture wherein the mixing chamber has a diverging upper portion and a converging lower portion; and
  - a mixer/swirler disposed in a central portion of the mixing chamber and comprising a plurality of vanes positioned in the central portion between the diverging upper portion and the converging lower portion of the mixing chamber, wherein the mixer/swirler is structured and arranged in the mixing chamber for stabilizing the fuel vapor mixture prior to introduction of the fuel vapor mixture through an entrance to the fuel reformer, and
- a catalytic reactor for reforming the fuel vapor mixture into the hydrogen-rich fluid.

37. An improvement to a fuel cell, the improvement comprising a fuel reformer that reforms a liquid fuel into a hydrogen-rich fluid, the fuel reformer comprising:
- an integrated fuel injection and mixing system for atomizing and mixing a liquid fluid for introduction into the fuel reformer, the system including:
  - a fluid injector, having an injector tip, for generating fine droplets of the liquid fluid under pressure;
  - a mixing chamber that is in communication with an outlet at the injector tip of the fluid injector for atomizing and mixing the fine droplets of liquid fluid from said fluid injector with a second fluid to provide a fuel vapor mixture, wherein the mixing chamber has a diverging upper portion and a converging lower portion; and
  - a mixer/swirler disposed in a central portion of the mixing chamber and comprising a plurality of vanes positioned in the central portion between the diverging upper portion and the converging lower portion of the mixing chamber, wherein the mixer/swirler is structured and arranged in the mixing chamber for stabilizing the fuel vapor mixture prior to introduction of the fuel vapor mixture through an entrance to the fuel reformer, and
- a catalytic reactor for reforming the fuel vapor mixture into the hydrogen-rich fluid.

* * * * *